(12) United States Patent
Morelli et al.

(10) Patent No.: US 8,947,985 B1
(45) Date of Patent: Feb. 3, 2015

(54) HEAT ASSISTED MAGNETIC RECORDING TRANSDUCERS HAVING A RECESSED POLE

(71) Applicant: Western Digital (Fremont), LLC, Fremont, CA (US)

(72) Inventors: Michael V. Morelli, San Jose, CA (US); Lisha Wang, Fremont, CA (US); Zhigang Bai, Fremont, CA (US); Hongxing Yuan, San Ramon, CA (US); Yunfei Li, Fremont, CA (US); Zhanjie Li, Pleasanton, CA (US); Matthew R. Gibbons, San Jose, CA (US); Samuel W. Yuan, Saratoga, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/034,487

(22) Filed: Sep. 23, 2013

Related U.S. Application Data

(60) Provisional application No. 61/846,922, filed on Jul. 16, 2013.

(51) Int. Cl.
*G11B 11/00* (2006.01)
*G11B 13/04* (2006.01)

(52) U.S. Cl.
CPC ..................... *G11B 13/045* (2013.01)
USPC ................ 369/13.33; 369/13.13; 369/112.27; 360/59; 360/125.31

(58) Field of Classification Search
USPC .......... 369/13.33, 13.32, 13.24, 13.23, 13.14, 369/13.03, 13.02, 13.12, 13.13, 13.01, 369/13.35, 112.27; 360/59, 125.31, 125.74
See application file for complete search history.

(56) References Cited

U.S. PATENT DOCUMENTS

| 4,743,083 | A | 5/1988 | Schimpe |
| 5,173,909 | A | 12/1992 | Sakano et al. |
| 5,199,090 | A | 3/1993 | Bell |
| 5,341,391 | A | 8/1994 | Ishimura |
| 5,625,729 | A | 4/1997 | Brown |

(Continued)

FOREIGN PATENT DOCUMENTS

| EP | 1498878 A2 | 1/2005 |
| EP | 1501076 A1 | 1/2005 |

OTHER PUBLICATIONS

Chubing Peng, "Surface-plasmon resonance of a planar lollipop near-field transducer", Applied Physics Letters 94, 171106 (2009), 3 pages.

(Continued)

*Primary Examiner* — Ali Neyzari

(57) ABSTRACT

A heat assisted magnetic recording (HAMR) write transducer has an air-bearing surface (ABS) configured to reside in proximity to a media during use and is coupled with a laser that provides energy. The HAMR transducer includes a main pole, at least one additional pole adjacent to the main pole in a down track direction, a waveguide and at least one coil for energizing the main pole. The main pole is configured to write to a region of the media and is recessed from the ABS by a first distance. The additional pole(s) are recessed from the ABS by a second distance greater than the first distance. The waveguide is optically coupled with the laser and directs a portion of the energy toward the ABS at an acute angle from the ABS. A portion of the waveguide resides between the additional pole(s) and the ABS.

26 Claims, 6 Drawing Sheets

(56) References Cited

U.S. PATENT DOCUMENTS

| | | |
|---|---|---|
| 5,960,014 A | 9/1999 | Li et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,063 B1 | 2/2001 | Cameron |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,275,453 B1 | 8/2001 | Ueyanagi et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |

(56) References Cited

U.S. PATENT DOCUMENTS

| | | |
|---|---|---|
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,671,127 B2 | 12/2003 | Hsu et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,195 B2 | 2/2004 | Miyanishi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,834,027 B1 | 12/2004 | Sakaguchi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,930,975 B2 | 8/2005 | Tawa et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,810 B2 | 11/2005 | Kasiraj et al. |
| 6,969,989 B1 | 11/2005 | Mei |
| 6,975,486 B2 | 12/2005 | Chen et al. |
| 6,975,580 B2 | 12/2005 | Rettner et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,027,700 B2 | 4/2006 | Challener |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,082,007 B2 | 7/2006 | Liu et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,241 B2 | 11/2006 | Che et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,171,080 B2 | 1/2007 | Rausch |
| 7,177,117 B1 | 2/2007 | Jiang et al. |
| 7,190,539 B1 | 3/2007 | Nibarger |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,268 B2 | 9/2007 | Challener et al. |
| 7,272,079 B2 | 9/2007 | Challener |
| 7,280,325 B1 | 10/2007 | Pan |
| 7,283,327 B1 | 10/2007 | Liu et al. |

(56) References Cited

U.S. PATENT DOCUMENTS

| | | |
|---|---|---|
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,330,404 B2 | 2/2008 | Peng et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,656 B2 | 5/2008 | Satoh et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,394,607 B2 | 7/2008 | Ohno et al. |
| 7,408,731 B2 | 8/2008 | Uemura et al. |
| 7,417,813 B2 | 8/2008 | Lim et al. |
| 7,417,821 B2 | 8/2008 | Tsuchinaga |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,221 B2 | 10/2008 | Tsuchinaga et al. |
| 7,440,660 B1 | 10/2008 | Jin et al. |
| 7,443,625 B2 | 10/2008 | Hamaguchi et al. |
| 7,443,632 B1 | 10/2008 | Stoev et al. |
| 7,444,740 B1 | 11/2008 | Chung et al. |
| 7,486,460 B2 | 2/2009 | Tsuchinaga et al. |
| 7,486,709 B2 | 2/2009 | Hu et al. |
| 7,490,212 B2 | 2/2009 | Kasiraj et al. |
| 7,492,804 B2 | 2/2009 | Tawa |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,567,387 B2 | 7/2009 | Itagi et al. |
| 7,580,602 B2 | 8/2009 | Itagi et al. |
| 7,583,466 B2 | 9/2009 | Kermiche et al. |
| 7,595,967 B1 | 9/2009 | Moon et al. |
| 7,596,072 B2 | 9/2009 | Buechel et al. |
| 7,596,295 B2 | 9/2009 | Hasegawa |
| 7,639,457 B1 | 12/2009 | Chen et al. |
| 7,649,677 B2 | 1/2010 | Jin et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,791,839 B2 | 9/2010 | Olson et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,839,497 B1 | 11/2010 | Rausch et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,880,996 B2 * | 2/2011 | Stipe .............................. 360/59 |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,031,561 B2 * | 10/2011 | Hellwig et al. ............ 369/13.01 |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,169,881 B2 | 5/2012 | Balamane et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,228,779 B2 | 7/2012 | Peng et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |

(56) References Cited

U.S. PATENT DOCUMENTS

| | | |
|---|---|---|
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,264,919 B2 | 9/2012 | Komura et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,416,646 B2 | 4/2013 | Huang et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,555 B2 | 5/2013 | Seigler et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,619,535 B2 * | 12/2013 | Balamane et al. ....... 369/112.27 |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,630,517 B2 | 1/2014 | Okayama |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |

(56) References Cited

U.S. PATENT DOCUMENTS

| | | | |
|---|---|---|---|
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 2001/0006435 A1 | 7/2001 | Ichihara et al. |
| 2001/0017820 A1 | 8/2001 | Akiyama et al. |
| 2003/0039443 A1 | 2/2003 | Catchmark et al. |
| 2003/0184903 A1 | 10/2003 | Challener |
| 2003/0198146 A1 | 10/2003 | Rottmayer et al. |
| 2004/0001394 A1 | 1/2004 | Challener et al. |
| 2004/0001420 A1 | 1/2004 | Challener |
| 2004/0008943 A1 | 1/2004 | Berini |
| 2004/0027728 A1 | 2/2004 | Coffey et al. |
| 2004/0223249 A1 | 11/2004 | Kang et al. |
| 2004/0228022 A1 | 11/2004 | Ueyanagi |
| 2005/0047013 A1 | 3/2005 | Le et al. |
| 2005/0069298 A1 | 3/2005 | Kasiraj et al. |
| 2005/0071537 A1 | 3/2005 | New et al. |
| 2005/0078565 A1 | 4/2005 | Peng et al. |
| 2005/0122850 A1 | 6/2005 | Challener et al. |
| 2005/0157393 A1 | 7/2005 | Hasegawa et al. |
| 2005/0157595 A1 | 7/2005 | Tawa et al. |
| 2005/0289576 A1 | 12/2005 | Challener |
| 2006/0232874 A1 | 10/2006 | Tsuchinaga et al. |
| 2007/0030588 A1 | 2/2007 | Tsuchinaga et al. |
| 2007/0081426 A1 | 4/2007 | Lee et al. |
| 2007/0081427 A1 | 4/2007 | Suh et al. |
| 2007/0223132 A1 | 9/2007 | Tsuchinaga |
| 2008/0002529 A1 | 1/2008 | Sekine et al. |
| 2008/0049563 A1 | 2/2008 | Konno et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0204916 A1 | 8/2008 | Matsumoto et al. |
| 2008/0232225 A1 | 9/2008 | Cho et al. |
| 2010/0020431 A1 | 1/2010 | Shimazawa et al. |
| 2010/0290157 A1 | 11/2010 | Zhang et al. |
| 2011/0086240 A1 | 4/2011 | Xiang et al. |
| 2011/0205866 A1 | 8/2011 | Osawa et al. |
| 2011/0228651 A1 | 9/2011 | Gage et al. |
| 2011/0228652 A1 | 9/2011 | Gage et al. |
| 2011/0235480 A1 | 9/2011 | Goulakov et al. |
| 2012/0020195 A1 | 1/2012 | Seigler |
| 2012/0039155 A1 | 2/2012 | Peng et al. |
| 2012/0082016 A1 | 4/2012 | Komura et al. |
| 2012/0084969 A1 | 4/2012 | Tanaka et al. |
| 2012/0111826 A1 | 5/2012 | Chen et al. |
| 2012/0113770 A1 | 5/2012 | Stipe |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0133182 A1 | 5/2013 | Bonh te et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0133283 A1 | 5/2014 | Maletzky et al. |
| 2014/0154529 A1 | 6/2014 | Yang et al. |
| 2014/0175050 A1 | 6/2014 | Zhang et al. |

OTHER PUBLICATIONS

Y.P. Rakovich, et al., "Photonic Nanojets in Coupled Microcavities", European Conference on Lasers and Electro-Optics 2009 and the European Quantum Electronics Conference (CLEO Europe - EQEC 2009), Munich, Jun. 14-19, 2009, IEEE, pp. 5191625.

Galan, et al., "Horizontal slot waveguide-based efficient fiber couplers suitable for silicon photonics", Eindhoven, The Netherlands, pp. 237-240, Jun. 2008.

William A. Challener, "Minitarure planar solid immersion mirror with focused spot less than a quarter wavelength", Optics Express, vol. 13. No. 18, Sep. 5, 2005, 9 pages.

Robert E. Rottmayer, 'Heat-Assisted Magnetic Recording, IEEEE Transactions on Magentics, vol. 42, No. 10, Oct. 2006, 5 pages.

Michael A. Seigler, "Integrated Heat Assisted Magnetic Recording Head: Design and Recording Demonstration", IEEE Transactions on Magnetics, vol. 44. No. 1, Jan. 2008, 6 pages.

Alexander Krichevsky, et. al., U.S. Appl. No. 13/927,996, filed Jun. 26, 2013, 30 pages.

Zhong Shi, et. al., U.S. Appl. No. 13/919,949, filed Jun. 17, 2013, 21 pages.

Zhong Shi, et. al., U.S. Appl. No. 13/797,268, filed Mar. 12, 2013, 21 pages.

* cited by examiner

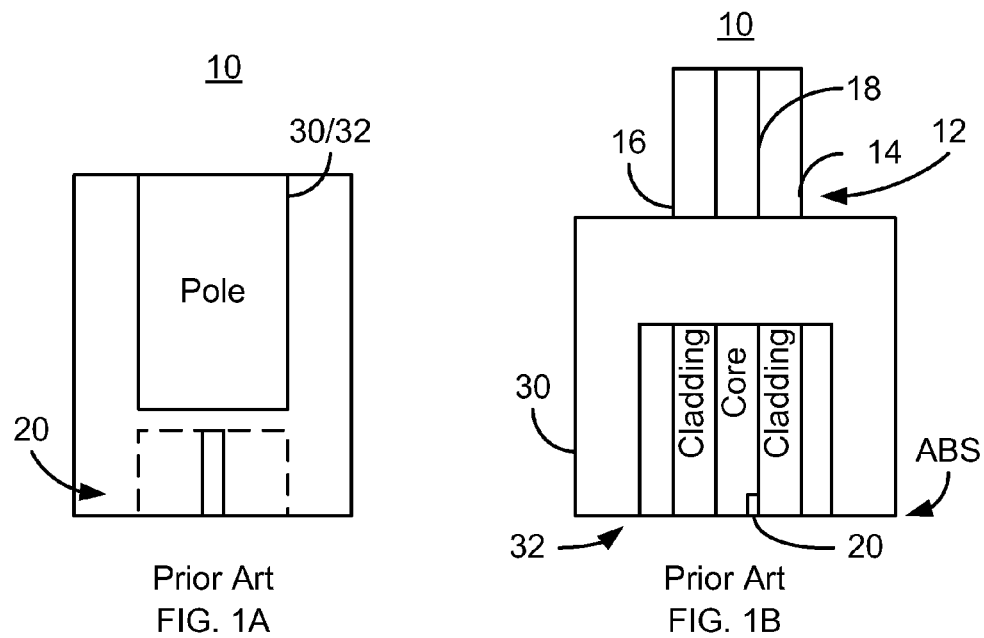
Prior Art
FIG. 1A
Prior Art
FIG. 1B
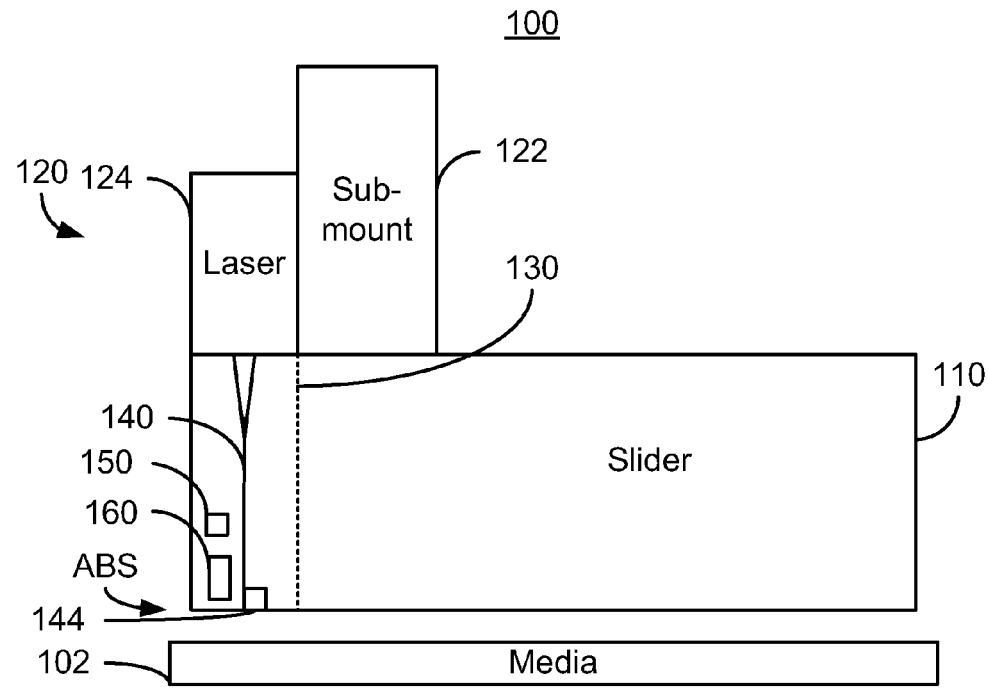
FIG. 2

HEAT ASSISTED MAGNETIC RECORDING TRANSDUCERS HAVING A RECESSED POLE

CROSS-REFERENCE TO RELATED APPLICATIONS

This application claims priority to provisional U.S. Patent Application Ser. No. 61/846,922, filed on Jul. 16, 2013, which is hereby incorporated by reference in its entirety.

BACKGROUND

FIGS. 1A and 1B depict ABS and side views of a portion of a conventional heat assisted magnetic recording (HAMR) transducer 10. For clarity, FIGS. 1A and 1B are not to scale. The conventional HAMR transducer 10 is used in writing a recording media (not shown in FIGS. 1A-1B) and receives light, or energy, from a conventional laser (not shown in FIGS. 1A-1B). The conventional HAMR transducer 10 includes a conventional waveguide 12 having cladding 14 and 16 and core 18, a conventional near-field transducer (NFT) 20, and a conventional pole 30. The conventional pole 30 includes a pole tip 32 having a surface at the air-bearing surface (ABS). Light from a laser (not shown) is incident on and coupled into the waveguide 12. Light is guided by the conventional waveguide 12 to the NFT 20 near the ABS. The NFT 20 focuses the light to magnetic recording media (not shown), such as a disk. This region is thus heated. The write pole 30 is energized and field from the pole tip 32 is used to write to the heated portion of the recording media.

Although the conventional HAMR transducer 10 functions, there are drawbacks. In particular, integration of the magnetic portions of the transducer 10 with the optical portions of the HAMR transducer 10 may be challenging. For example, the field from the conventional pole tip 32 at the media may not be in the direction desired. In some cases, the field, which is desired to be close to perpendicular to the ABS, may be almost parallel to the ABS at the recording media. As a result, the performance of the conventional HAMR transducer 10 may be adversely affected.

BRIEF DESCRIPTION OF SEVERAL VIEWS OF THE DRAWINGS

FIGS. 1A and 1B depict side and plan views of a conventional heat assisted magnetic recording head.

FIG. 2 is a diagram depicting a side view of an exemplary embodiment of a HAMR disk drive.

DETAILED DESCRIPTION OF THE PREFERRED EMBODIMENTS

Figure 3:
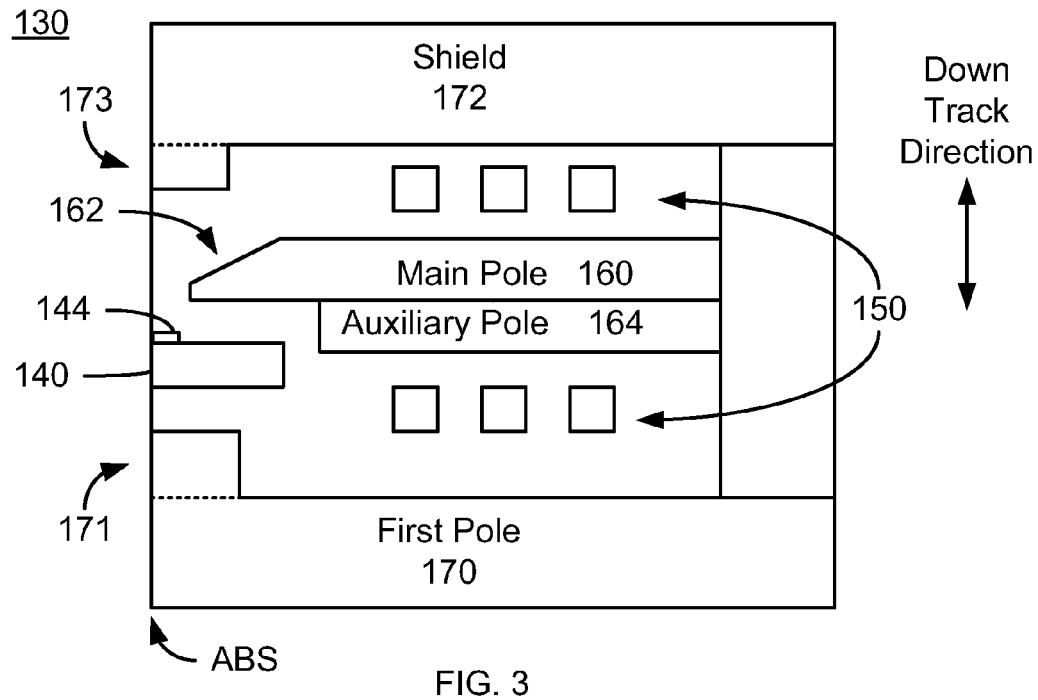
FIG. 3 is a diagram depicting a side view of an exemplary embodiment of a portion of a HAMR write transducer.

FIG. 2 depicts a side view of an exemplary embodiment of a portion of a heat-assisted magnetic recording (HAMR) disk drive 100. For clarity, FIG. 2 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components are shown. However, multiples of each component and their sub-components, might be used.

The HAMR disk drive 100 includes media 102, a slider 110, a laser subassembly 120 and a HAMR head 130. Additional and/or different components may be included in the HAMR disk drive 100. Although not shown, the slider 110, and thus the laser assembly 120 and HAMR transducer 130 are generally attached to a suspension (not shown). The laser assembly 120 includes a submount 122 and a laser 124. The submount 122 is a substrate to which the laser 124 may be affixed for improved mechanical stability, ease of manufacturing and better robustness. The laser 124 may be a chip such as a laser diode or other laser.

FIG. 3 is a side view of an exemplary embodiment of a portion the HAMR disk drive 100. More specifically, an exemplary embodiment of part of the HAMR transducer 130 is shown. For clarity, FIG. 3 is not to scale. Referring to FIGS. 2-3, for simplicity not all portions of the HAMR transducer 130 are shown. In addition, although the disk drive 100 and HAMR transducer 130 are depicted in the context of particular components other and/or different components may be used. For example, circuitry used to drive and control various portions of the HAMR transducer 130 is not shown. For simplicity, only single components are shown. However, multiples of one or more of the components and/or and their sub-components, might be used.

The HAMR transducer 130 is fabricated on the slider 110 and includes an air-bearing surface (ABS) proximate to the media 102 during use. In general, the HAMR write transducer 130 and a read transducer are present in the HAMR head. However, for clarity, only the HAMR write transducer 130 is shown. The HAMR transducer 130 includes a waveguide 140, near-field transducer (NFT) 144, coil(s) 150 and write pole 160. FIG. 3 also depicts an auxiliary pole 164, a first pole 170 and shield 172. The shield 172 and first pole 170 are magnetic. In the embodiment shown, the first pole 170 and shield 172 each include pedestal portions 171 and 173, respectively. However, in other embodiments, the components 170 and 172 may be configured differently or omitted. In other embodiments, different and/or additional components may be used in the HAMR transducer 130.

The waveguide 140 is optically coupled with the laser 134 and guides light energy from the laser 134 toward the ABS. In the embodiment shown the waveguide 140 directs the energy from the laser to the NFT 144. Note that for simplicity, FIG. 3 depicts only a portion of the waveguide 140 at the ABS. In some embodiments, the waveguide 140 is configured to direct the energy toward the ABS at an acute angle from the ABS. For example, the waveguide 140 may be an interferometric waveguide that includes a plurality of arms. Typically, there are two arms. The energy from the laser 134 is being split between the arms of the waveguide 140 and directed toward the ABS. An interference pattern from the light is formed at the ABS in the region of the NFT 144. It is the arms of the waveguide 140 that may be considered to form the acute angle with the ABS. In such embodiments, the waveguide 140 may be formed and guide the light around the main pole 160.

The NFT 144 resides at or near the ABS and utilizes local resonances in surface plasmons to focus the light to magnetic recording media 102. At resonance, the NFT 144 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 160 energized by the coils 150 to a modest magnetic field.

The coils 150 may form a single helical coil or may be portions of two pancake coils. In some embodiments, a single pancake coil may be used instead of two. Further, although depicted as a single layer, multiple layers may be used for the coils 150. As discussed above, a current driven through the coils 150 may energize the main pole 160 to provide a magnetic write field. In some embodiments, the coils 150 on one side of the main pole 160 carry current in a different direction than the coils in the opposite side of the main pole 160. For example, in the embodiment shown, coils on one sides of the main pole 160 in the down track direction may carry current into the page, while the coils 150 on the opposite side of the main pole 160 in the down track direction may carry current out of the plane of the page. As a result, the magnetic field generated by the coils 150 may be additive in the region of the main pole 160.

The main, or write, pole 160 is recessed from the ABS but is still configured to write to the media 102. For example, the main pole 160 may be at least five nanometers from the ABS. In some embodiments, the main pole 160 is recessed by at least thirty nanometers and not more than one hundred fifty nanometers. In some such embodiments, the main pole is at least fifty nanometers from the ABS. The main pole 160 may also be not more than one hundred nanometers from the ABS. In some such embodiments, the target distance between the ABS and the portion of the main pole 160 closest to the ABS is sixty nanometers. In the embodiment shown, the main pole 160 also includes trailing edge (top) bevel 162. In the embodiment shown in FIG. 3, the main pole 160 the main pole 160 is recessed further from the ABS than the NFT 144 extends. However, in other embodiments, the NFT 144 may extend as far as or further from the ABS than the main pole 160 is recessed from the ABS. In such embodiments, the main pole 160 may be considered to overlap a portion of the NFT 144 in the down track direction. The main pole 160 also generally overlaps the waveguide 140 in the down track direction. Stated differently, the waveguide 140 may extend further from the ABS than the main pole 160 is recessed from the ABS.

FIG. 3 also depicts an auxiliary pole 164. An ABS facing surface of the auxiliary pole 164 is located closest to the ABS in FIG. 3. As can be seen in FIG. 3, the auxiliary pole 164 resides in the down track direction from the main pole 160. The auxiliary pole 164 is also shown as adjoining, or sharing an interface with, the main pole 160. The auxiliary pole 164 is also recessed from the ABS. More specifically, the auxiliary pole 164 is recessed further form the ABS than the main pole 164 is. In addition, the auxiliary pole 164 is recessed from the ABS by a distance greater than or equal to the width of the waveguide 140. Thus, there is space between the auxiliary pole 164 and the ABS through which the waveguide 140 may fit. In the embodiment shown, the auxiliary pole 164 is recessed further from the ABS than the width of the waveguide 140. The auxiliary pole 164 may be recessed by at least five hundred nanometers. In other embodiments, the auxiliary pole 164 may be recessed by at least one micron. However, other distances are possible.

In operation, the laser 134 emits light that is provided to the waveguide 140. The waveguide 140 directs the light to the NFT 144. As discussed above, a portion of the waveguide 140 directs light at an acute angle from the ABS in the region near the ABS. The NFT 144 focuses the light to a region of magnetic recording media 102 using surface plasmons. The NFT 144 thus couples the optical energy of the light into the recording medium layer of the media 102 with a confined optical spot. This optical spot can typically heat the recording medium layer above the Curie point on the sub-nanosecond scale. Write current(s) are driven through the coils 150 to energize the main pole 160. High density bits can be written on a high coercivity medium using the write pole 160 energized by the coils 150 to a lower magnetic write field than would be possible in the absence of heating of the media 102.

The HAMR disk drive 100 may exhibit improved performance. More specifically, the recessed main pole 160 may improve performance of the writer 130. Because the main pole 160 is recessed from the ABS, there may be greater space between the main pole 160 and optical components such as the NFT 144 and/or waveguide 140. Interference in operation of the optical components by the magnetic field generated by the main pole 160 may be reduced. Optical performance of the HAMR transducer 130 may thus be improved. Further, the location of the main pole 160 may allow for a field that has the desired angle with the media 102. In some embodiments, for example, the write field may be closer to perpendicular to the media 102/ABS. The magnetic field may be further enhanced if the turns of the coils 150 on opposite sides of the main pole 160 carry current in opposite directions. Thus, performance and reliability of the HAMR transducer 130 and the disk drive 100 may be enhanced.

Figure 4:
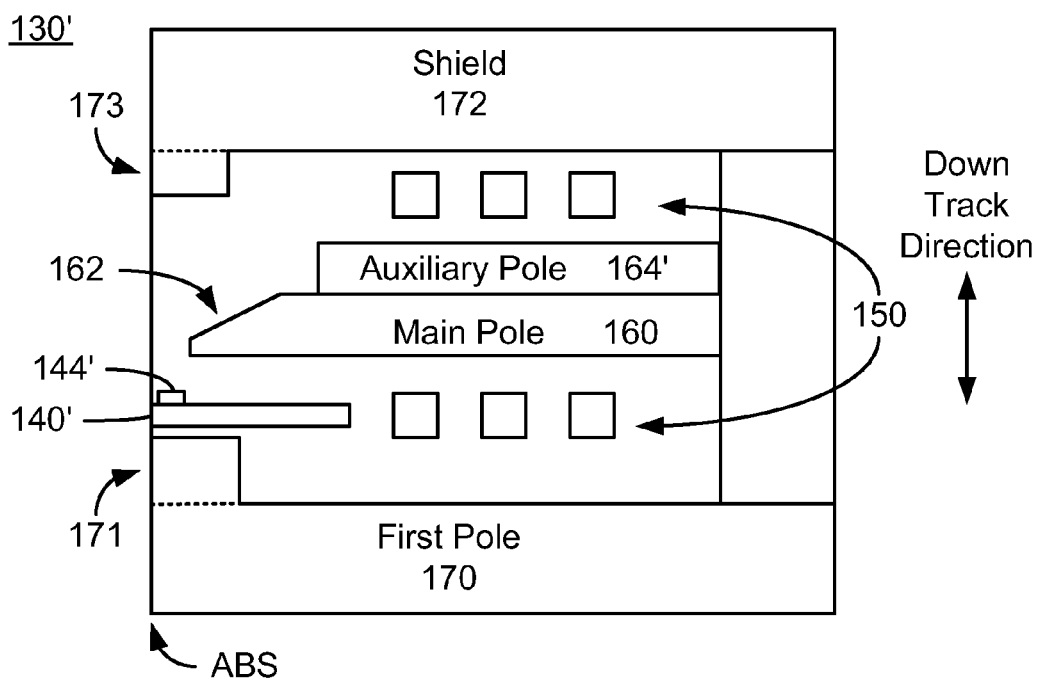
FIG. 4 is a diagram depicting a side view of another exemplary embodiment of a portion of a HAMR write transducer.

FIG. 4 depicts a plan view of another exemplary embodiment of a portion of a HAMR transducer 130'. For clarity, FIG. 4 is not to scale. For simplicity not all portions of the HAMR transducer 130' are shown. The HAMR transducer 130' is analogous to the HAMR transducer 130. Consequently, analogous components have similar labels. Further, the HAMR transducer 130' may be used in the HAMR disk drive 100.

Referring to FIGS. 2 and 4, the HAMR transducer 130' includes a waveguide 140', an NFT 144', coils 150, main pole 160, auxiliary pole 164', first pole 170 having pedestal 171 and shield 172 having pedestal 173 that are analogous to the waveguide 140, NFT 144, coils 150, main pole 160, auxiliary pole 164, first pole 170 having pedestal 171 and shield 172 having pedestal 173, respectively. The main pole 160 is still recessed from the ABS in a manner analogous to the HAMR transducer 130.

In the embodiment shown in FIG. 4, the auxiliary pole 164' is on the opposite of the main pole 160 as the waveguide 140'. Thus, as can be seen in FIG. 4, the width of the waveguide 140' perpendicular to the ABS may be greater than the distance the auxiliary pole 164' is recessed from the ABS. However, in other embodiments, the waveguide 140' may have a width that is less than the amount which the auxiliary pole 164' is recessed, in a manner analogous to the auxiliary pole 164 depicted in FIG. 3. Referring back to FIG. 4, the auxiliary pole 164', main pole 160 and the remainder of the HAMR transducer 130' may function in an analogous manner to the auxiliary pole 164, main pole 160 and HAMR transducer 130.

The HAMR transducer 130' may share the benefits of the HAMR transducer 130 and the HAMR disk drive 100. Recessing the main pole 160 may improve the optical and/or magnetic performance of the writer 130. The magnetic field may be further enhanced if the turns of the coils 150 on opposite sides of the main pole 160 carry current in opposite directions. Thus, performance and reliability of the HAMR transducer 130' and the disk drive 100 may be enhanced.

Figure 5:
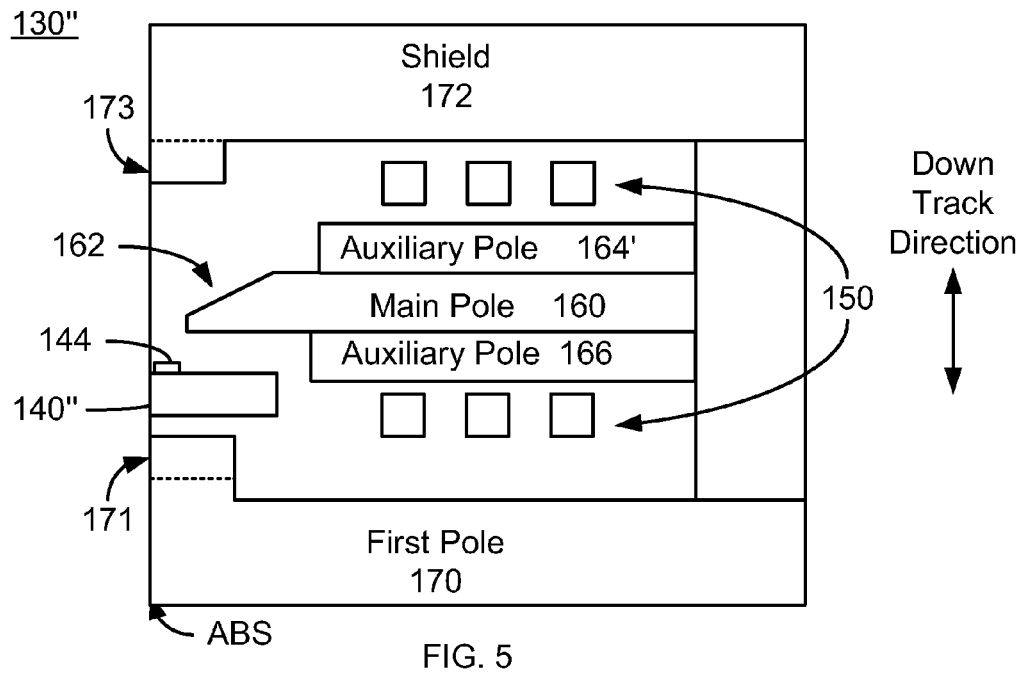
FIG. 5 is a diagram depicting a side view of another exemplary embodiment of a portion of a HAMR write transducer.

FIG. 5 depicts a plan view of another exemplary embodiment of a portion of a HAMR transducer 130". For clarity, FIG. 5 is not to scale. For simplicity not all portions of the HAMR transducer 130" are shown. The HAMR transducer 130" is analogous to the HAMR transducer(s) 130 and/or 130'. Consequently, analogous components have similar labels. Further, the HAMR transducer 130" may be used in the HAMR disk drive 100.

Referring to FIGS. 2 and 5, the HAMR transducer 130" includes a waveguide 140", an NFT 144, coils 150, main pole 160, auxiliary pole 164', first pole 170 having pedestal 171 and shield 172 having pedestal 173 that are analogous to the waveguide 140/140', NFT 144/144', coils 150, main pole 160, auxiliary pole 164/164', first pole 170 having pedestal 171 and shield 172 having pedestal 173, respectively. The main pole 160 is still recessed from the ABS in a manner analogous to the HAMR transducer 130.

In the embodiment shown in FIG. 5, an additional auxiliary pole 166 is provided. Thus, the auxiliary poles 164' and 166 adjoin the main pole 160 on the opposite and same sides of the main pole 160 as the waveguide 140". Thus, as can be seen in FIG. 5, the width of the waveguide 140" perpendicular to the ABS may be less than or equal the distance the auxiliary pole 166 is recessed from the ABS. In some embodiments, the waveguide 140" has a width that is less than the amount which the auxiliary pole 166 is recessed. In the embodiment shown, the auxiliary poles 164' and 166 are recessed from the ABS by different distances. However, in other embodiments, the auxiliary poles 164' and 166 may be recessed from the ABS by the same distance. The HAMR transducer 130" may function in an analogous manner to the HAMR transducer(s) 130 and 130'.

The HAMR transducer 130" may share the benefits of the HAMR transducer(s) 130/130' and the HAMR disk drive 100. Recessing the main pole 160 may improve the optical and/or magnetic performance of the writer 130. The magnetic field may be further enhanced if the turns of the coils 150 on opposite sides of the main pole 160 carry current in opposite directions. Thus, performance and reliability of the HAMR transducer 130" and the disk drive 100 may be enhanced.

Figure 6:
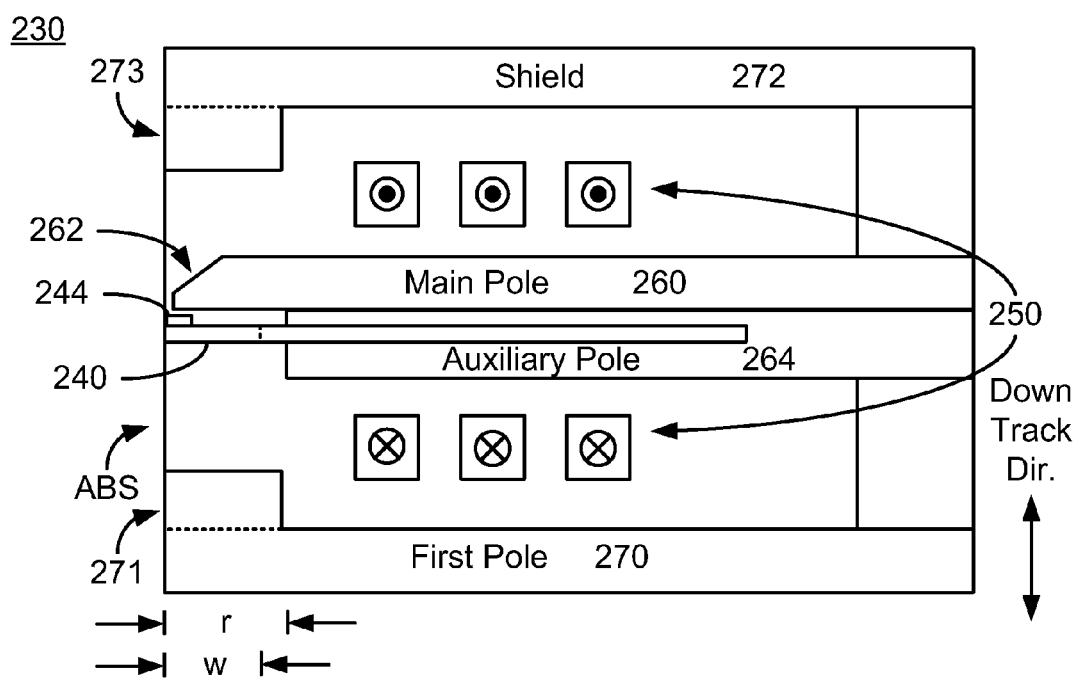
FIG. 6-8 are diagrams depicting side, close-up side and plan views of another exemplary embodiment of a portion of a HAMR write transducer.
Figure 7:
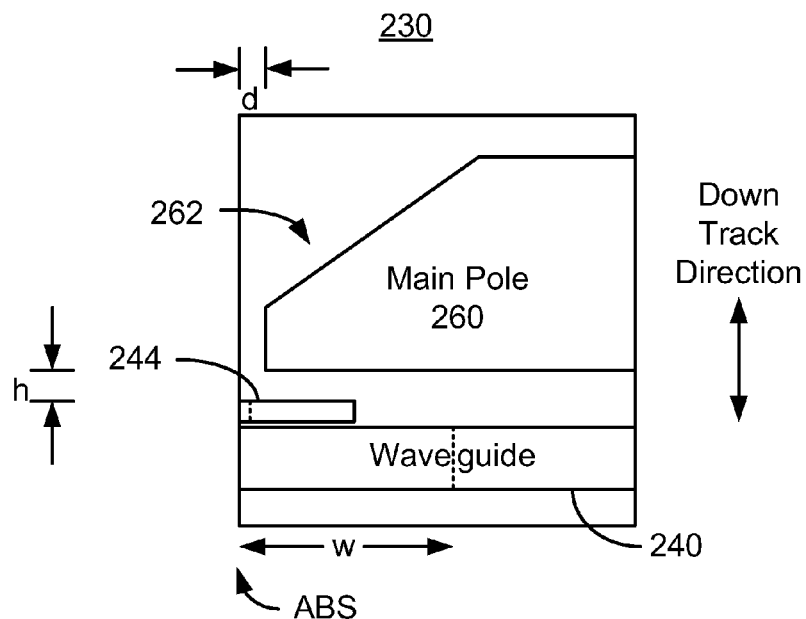
Figure 8:
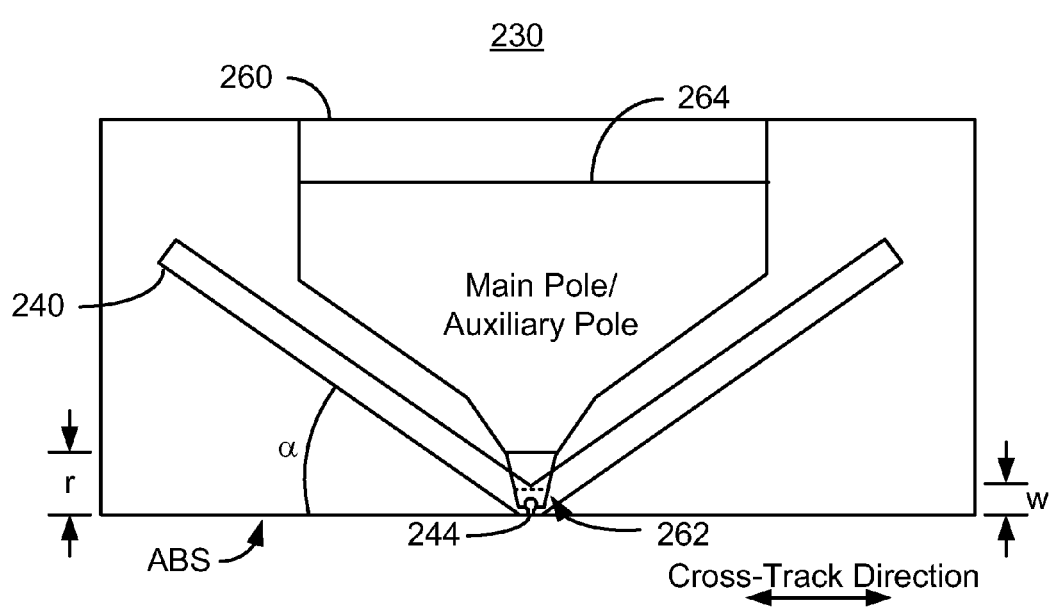
Figure 9:
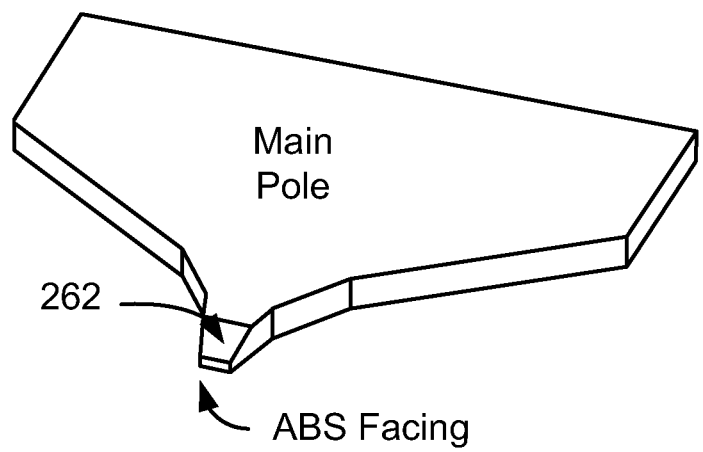
FIG. 9 is a diagram depicting a perspective view of another exemplary embodiment of a magnetic recording main pole.
Figure 10:
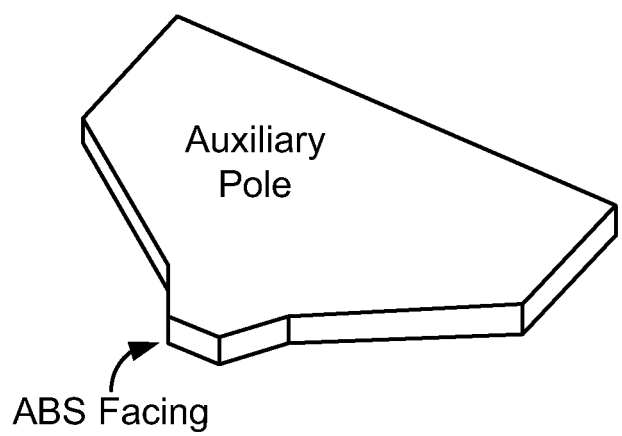
FIG. 10 is a diagram depicting a perspective view of another exemplary embodiment of a magnetic recording auxiliary pole.

FIG. 6-8 are diagrams depicting side, close-up side and plan views of another exemplary embodiment of a portion of a HAMR write transducer 230. For clarity, FIGS. 6-8 are not to scale. For simplicity not all portions of the HAMR transducer 230 are shown. The HAMR transducer 230 is analogous to the HAMR transducer(s) 130, 130' and/or 130". Consequently, analogous components have similar labels. Further, the HAMR transducer 230 may be used in the HAMR disk drive 100. The HAMR transducer 230 thus includes a waveguide 240, an NFT 244, coils 250, main pole 260 having bevel 262, auxiliary pole 264, first pole 270 having pedestal 271 and shield 272 having pedestal 273 that are analogous to the waveguide 140/140'/140", NFT 144/144', coils 150, main pole 160, auxiliary pole 164/164', first pole 170 having pedestal 171 and shield 172 having pedestal 173, respectively. The function and arrangement of these components are analogous to those depicted in FIGS. 2-5. FIGS. 9 and 10 depict perspective views of the main pole 260 and auxiliary pole 264, respectively.

Referring to FIGS. 6-10, the main pole 260 is recessed form the ABS. This may be best seen in FIGS. 6-8. The main pole 260 also overlaps the NFT 244 in the down track direction. Stated differently, the NFT 244 extends further from the ABS than the main pole 260 is recessed from the ABS. This may be best seen in FIG. 7. In some embodiments, the NFT 244 has a disk portion and a pin portion between the ABS and the disk portion. This may be seen in FIGS. 7-8. In some embodiments, the main pole 260 overlaps the disk portion, but not the pin portion. However, other amounts of overlap are possible.

As can be seen in FIGS. 6-8, the waveguide 240 has a width, w, at the ABS. The main pole 260 is recessed a distance d from the ABS and is a distance h from the NFT 244. The auxiliary pole 264 is recessed a distance r from the ABS. Thus, r is greater than w in the embodiment shown. In some embodiments, the width, w, is not more than 500 nm. As can be seen in FIGS. 6 and 8, the auxiliary pole 264 may be desired to be recessed at least fifty nanometers from the waveguide 240. Thus, r may be at least 550 nm. In some embodiments, r may be as large as 1-1.5 micron. As discussed above, d may be at least 30 nm and not more than 150 nm. In some embodiments, d is at least fifty and not more than one hundred nanometers. However, other distances are possible. The NFT 244 may extend up to seventy nanometers from the ABS. Thus, as discussed above, the main pole 260 may overlap the NFT 244. In some embodiments, h is at least ten and not more than fifty nanometers. However, h may also be at least fifteen and not more than twenty-five nanometers. Thus, the main pole 260 is separated from the NFT 244 in the down track direction. The main pole 260 may also be separated from the shield pedestal 273 by at least five hundred nanometers and not more than 1.1 micron in the down track direction. Similarly, the auxiliary pole 264 may be separated from the first pole pedestal 271 by at least five hundred nanometers and not more than 1.1 micron in the down track direction.

As can be seen in FIG. 8, the waveguide 240 is oriented at an acute angle, α, from the ABS. Note that only a portion of the waveguide closest to the ABS is depicted in FIG. 8. In the embodiment shown, the waveguide 240 is an interferometric waveguide including two arms, each of which may be oriented at an angle at or near the acute angle, α, from the ABS. Thus, the waveguide 240 directs light from the laser toward the ABS at an acute angle from the ABS.

As can be seen in FIG. 6, current may be driven through the coils 250 such that the currents on opposite sides of the main pole 260 are in opposite directions. In some embodiments, this may mean that the coils 250 form a helical coil. In other embodiments, the coils 250 shown in FIG. 6 may be parts of pancake coils.

The HAMR transducer 230 may share the benefits of the HAMR transducer(s) 130/130'.130" and the HAMR disk drive 100. Recessing the main pole 260 may improve the optical and/or magnetic performance of the writer 230. The magnetic field may be further enhanced because the turns of the coils 250 on opposite sides of the main pole 260 carry current in opposite directions. Thus, performance and reliability of the HAMR transducer 230 and the disk drive 100 may be enhanced.

Figure 11:
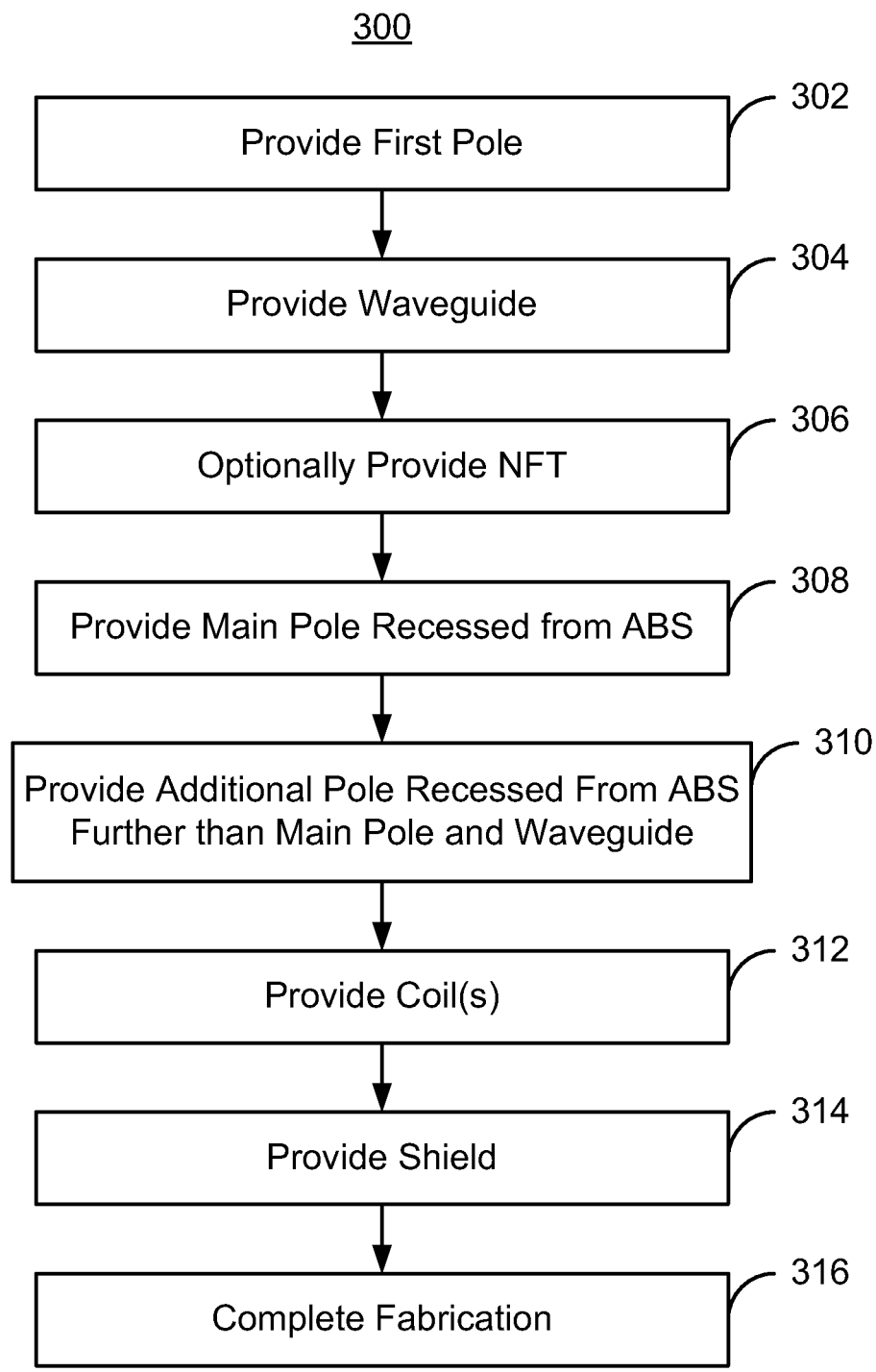
FIG. 11 is a flow chart depicting an exemplary embodiment of a method for fabricating a HAMR write transducer.

FIG. 11 is a flow chart depicting an exemplary embodiment of a method 300 for fabricating a HAMR write transducer. The method 300 may be used in fabricating transducers such as the transducers 130, 130', 130" and/or 230, though other transducers might be so fabricated. For clarity, the method 300 is described in the context of the transducer 130. For simplicity, some steps may be omitted, performed in another order, and/or combined. The magnetic recording transducer being fabricated may be part of a merged head that also includes a read head (not shown) and resides on a slider (not shown) in a disk drive. The method 300 is also described in the context of providing a single magnetic recording transducer. However, the method 300 may be used to fabricate multiple transducers at substantially the same time. The method 300 and system are also described in the context of particular layers. However, in some embodiments, such layers may include multiple sub-layers. The method 300 also may commence after formation of other portions of the transducer.

The first pole 170 is optionally provided, via step 302. In some embodiments, step 302 includes forming the pedestal 171 for the first pole 170. An insulator may also be provided on the first pole. The waveguide 140 may be provided, via step 304. Step 304 generally includes forming cladding layers surrounding a core layer. An NFT 144 may optionally be provided, via step 306. The NFT 144 is typically a metal such as gold and may include multiple substeps.

The main pole 160 is provided, via step 308. Step 308 includes ensuring that the main pole 160 is recessed from the ABS. Step 302 typically includes multiple deposition, masking and removal steps. One or both of the auxiliary pole(s) 164, 164', 166 and/or 260 are formed, via step 310. Step 310 is performed such that the auxiliary pole(s) are recessed further form the ABS than the width of the portion of the waveguide 144 at the ABS. The auxiliary pole(s) 164/164'/166/264 are also recessed further from the ABS than the main pole 160/260. The coil(s) 150/250 may then be provided, via step 312. The shield 1702/182 may also be fabricated, via step 314. Fabrication of the transducer may then be completed, via step 316.

Using the method 300, the HAMR transducer 130, 130', 130" and/or 230 may be fabricated. The benefit(s) of one or more of the HAMR transducer(s) 130, 130', 130" and/or 230 may thus be achieved.

We claim:

1. A heat assisted magnetic recording (HAMR) write transducer coupled with a laser for providing energy and having an air-bearing surface (ABS) configured to reside in proximity to a media during use, the HAMR transducer comprising:
    a main pole configured to write to a region of the media, the main pole being recessed from the ABS by a first distance;
    at least one additional pole adjacent to the main pole in a down track direction, the additional pole being recessed from the ABS by a second distance greater than the first distance;
    a waveguide optically coupled with the laser and directing a portion of the energy toward the ABS at an acute angle from the ABS, a portion of the waveguide residing between the at least one additional pole and the ABS; and
    at least one coil for energizing the main pole.

2. The HAMR write transducer of claim 1 wherein the first distance is at least thirty nanometers and not more than one hundred fifty nanometers.

3. The HAMR write transducer of claim 1 wherein the first distance is at least fifty nanometers.

4. The HAMR write transducer of claim 1 wherein the waveguide has a width at the ABS and wherein the second distance is at least as large as the width.

5. The HAMR write transducer of claim 1 wherein the waveguide is an interferometric waveguide including a plurality of arms, the energy from the laser being split between the plurality of arms and directed toward the ABS, the plurality of arms forming the angle with the ABS.

6. The HAMR write transducer of claim 1 wherein the at least one coil carries current in a first direction on a first side of the main pole and in a second direction on a second side of the main pole, the first side being opposite to the second side, the first direction being opposite to the second direction.

7. The HAMR write transducer of claim 1 wherein the at least one additional pole includes a first additional pole and a second additional pole, the main pole being between the first additional pole and the second additional pole.

8. The HAMR write transducer of claim 7 wherein the first additional pole and the second additional pole each adjoin the main pole.

9. The HAMR write transducer of claim 1 wherein the main pole includes a beveled surface and an ABS facing surface adjoining the beveled surface, the beveled surface forming a bevel angle with the ABS, the bevel angle being less than ninety degrees.

10. The HAMR write transducer of claim 1 further comprising:
    a near-field transducer (NFT), a portion of the NFT residing at the ABS, a first portion of the energy from the laser traveling through the waveguide such that the NFT couples a second portion of the energy from the laser to the media.

11. The HAMR write transducer of claim 10 wherein the NFT extends a third distance from the ABS, the third distance being greater than the first distance.

12. The HAMR write transducer of claim 10 wherein the NFT extends a third distance from the ABS, the third distance being not greater than the first distance.

13. The HAMR write transducer of claim 1 further comprising:
    a first pole having a pedestal, a portion of the pedestal residing at the ABS.

14. The HAMR write transducer of claim 13 further comprising:
    a shield having a shield pedestal, a portion of the shield pedestal residing at the ABS, the main pole residing between the shield and the first pole.

15. A HAMR write transducer coupled with a laser for providing energy and having an air-bearing surface (ABS) configured to reside in proximity to a media during use, the HAMR transducer comprising:
    a main pole configured to write to a region of the media, the main pole being recessed from the ABS by a first distance, having a beveled surface and an ABS-facing surface adjoining the beveled surface, the beveled surface forming a bevel angle with the ABS, the bevel angle being less than ninety degrees, the first distance being at least fifty nanometers and not more than one hundred fifty nanometers;
    at least one additional pole adjacent to the main pole in a down track direction, the additional pole being recessed from the ABS by a second distance greater than the first distance;
    an interferometric waveguide optically coupled with the laser and having a plurality of arms for directing a portion of the energy toward the ABS at an acute angle from the ABS, a portion of the waveguide having a width and residing between the at least one additional pole and the ABS, the second distance being at least as large as the width;
    at least one coil for energizing the main pole, the at least one coil carrying current in a first direction on a first side of the main pole and in a second direction on a second side of the main pole, the first side being opposite to the second side, the first direction being opposite to the second direction;
    a near-field transducer (NFT), a portion of the NFT residing at the ABS, a first portion of the energy from the laser traveling through the waveguide such that the NFT couples a second portion of the energy from the laser to the media;

a first pole having a pedestal, a portion of the pedestal residing at the ABS; and a shield having a shield pedestal, a portion of the shield pedestal residing at the ABS, the main pole residing between the shield and the first pole.

16. A heat assisted magnetic recording (HAMR) disk drive comprising:
   a media,
   a slider,
   a laser for providing energy; and
   a HAMR write transducer coupled with the slider, the HAMR write transducer having air-bearing surface (ABS), a main pole, at least one additional pole, a waveguide and at least one coil, the main pole being configured to write to a region of the media, the main pole being recessed from the ABS by a first distance, the at least one additional pole adjacent to the main pole in a down track direction, the additional pole being recessed from the ABS by a second distance greater than the first distance, the waveguide being optically coupled with the laser and directing a portion of the energy toward the ABS at an acute angle from the ABS, a portion of the waveguide residing between the at least one additional pole and the ABS, the at least one coil for energizing the main pole.

17. A method for fabricating a heat assisted magnetic recording (HAMR) write transducer coupled with a laser for providing energy and having an air-bearing surface (ABS) configured to reside in proximity to a media during use, the method comprising:
   providing a main pole configured to write to a region of the media, the main pole being recessed from the ABS by a first distance;
   providing at least one additional pole adjacent to the main pole in a down track direction, the additional pole being recessed from the ABS by a second distance greater than the first distance;
   providing a waveguide optically coupled with the laser and directing a portion of the energy toward the ABS at an acute angle from the ABS, a portion of the waveguide residing between the at least one additional pole and the ABS; and
   providing at least one coil for energizing the main pole.

18. The method of claim 17 wherein the first distance is at least thirty nanometers and not more than one hundred fifty nanometers.

19. The method of claim 17 wherein the waveguide has a width at the ABS and wherein the second distance is at least as large as the width.

20. The method of claim 17 wherein the waveguide is an interferometric waveguide including a plurality of arms, the energy from the laser being split between the plurality of arms and directed toward the ABS, the plurality of arms forming the angle with the ABS.

21. The method of claim 17 wherein the at least one coil carries current in a first direction on a first side of the main pole and in a second direction on a second side of the main pole, the first side being opposite to the second side, the first direction being opposite to the second direction.

22. The method of claim 17 wherein the step of providing the main pole further includes:
   providing a beveled surface and an ABS facing surface adjoining the beveled surface, the beveled surface forming a bevel angle with the ABS, the bevel angle being less than ninety degrees.

23. The method of claim 17 further comprising:
   providing a near-field transducer (NFT), a portion of the NFT residing at the ABS, a first portion of the energy from the laser traveling through the waveguide such that the NFT couples a second portion of the energy from the laser to the media.

24. The method of claim 23 wherein the NFT extends a third distance from the ABS, the third distance being greater than the first distance.

25. The method of claim 23 wherein the NFT extends a third distance from the ABS, the third distance being not greater than the first distance.

26. The method of claim 17 further comprising:
   providing a first pole having a pedestal, a portion of the pedestal residing at the ABS; and
   providing a shield having a shield pedestal, a portion of the shield pedestal residing at the ABS, the main pole residing between the shield and the first pole.

* * * * *